APPARATUS FOR CRIMPING ELECTRICAL CONNECTING DEVICES
Original Filed Oct. 9, 1967
3 Sheets-Sheet 1
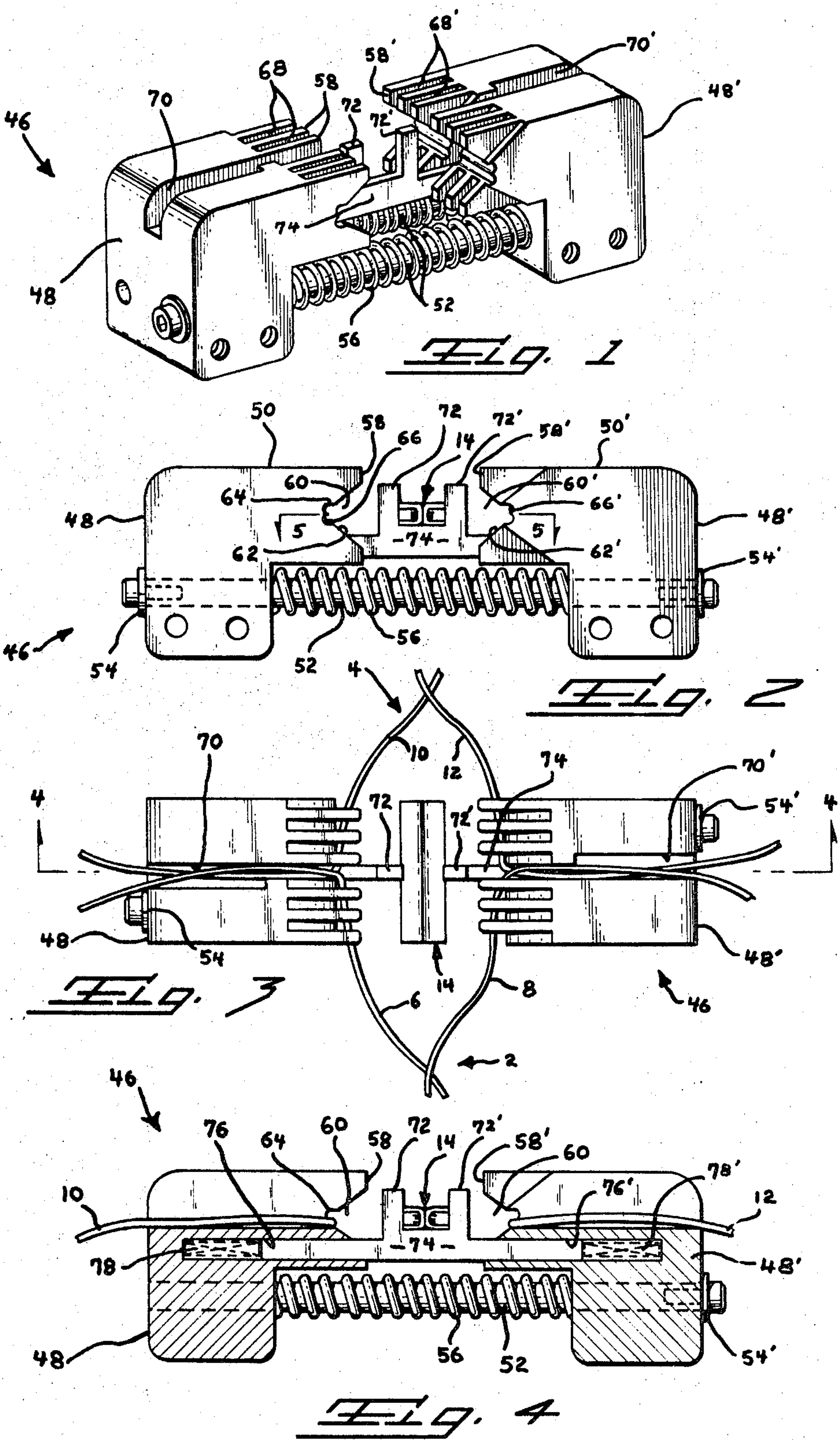

APPARATUS FOR CRIMPING ELECTRICAL CONNECTING DEVICES
Original Filed Oct. 9, 1967
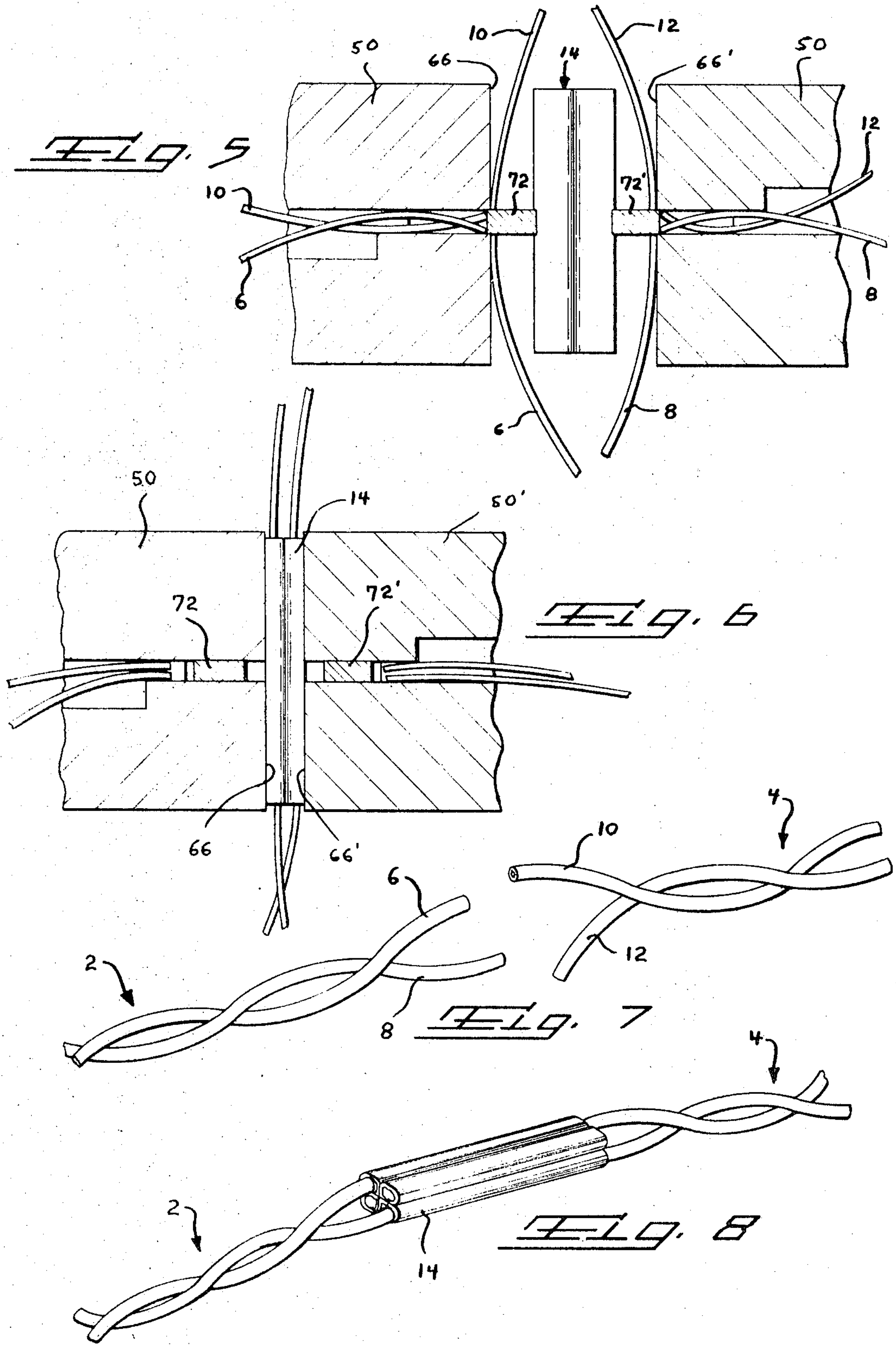

APPARATUS FOR CRIMPING ELECTRICAL CONNECTING DEVICES

Original Filed Oct. 9, 1967 3 Sheets-Sheet 3

United States Patent Office 3,557,429 Patented Jan. 26, 1971

3,557,429
APPARATUS FOR CRIMPING ELECTRICAL CONNECTING DEVICES

Stuart L. Parsons, Clearwater, Fla., assignor to AMP Incorporated, Harrisburg, Pa.

Original application Oct. 9, 1967, Ser. No. 673,856, now Patent No. 3,406,247, dated Oct. 15, 1968. Divided and this application July 23, 1968, Ser. No. 746,905
Int. Cl. H01r *43/04*
U.S. Cl. 29—203 4 Claims

ABSTRACT OF THE DISCLOSURE

Apparatus for crimping an electrical connecting device onto wires comprises a pair of normally spaced-apart crimping dies having forming surfaces on their opposed sides. A supporting means for an electrical connector is located between the dies and is adapted to support a connector having oppositely directed open sides. The dies have recess means on their opposed sides which are adapted to receive the supporting means so that the dies are permitted to move relatively towards each other and against the oppositely directed sides of the connecting device to crimp the connecting device onto the wires. In accordance with the preferred embodiment, the wire ends are led through the recess means so that when the supporting means moves into the recess means, the ends of the wires are trimmed immediately prior to crimping.

BACKGROUND OF THE INVENTION

This application is a division of my co-pending application Ser. No. 673,856, filed Oct. 9, 1967, and now U.S. Pat. No. 3,406,247.

The present invention is directed generally to the problem of forming two electrical connections among four or more conductors in a single operating cycle and by means of a single electrical connecting device. The invention is herein disclosed with particular reference to the splicing of telephone conductors which are commonly provided as pairs of conductors in a telephone cable. It will be understood, however, that the principles of the invention are generally applicable wherever it is desired to connect the corresponding wires of two pairs of conductors to each other.

In the telephone industry, the conductors used for individual telephone circuits are provided as twisted pairs of conductors, that is to say, two insulated wires helically intertwined along their lengths. One of these wires serves as a signal conductor and the other wire or conductors serve as a ground conductor for an individual telephone circuit. Telephone cables may contain large numbers of twisted pairs of insulated conductors, for example, one of the larger sizes of cables currently being used contains 2,700 pairs of conductors or 5,600 individual conductors.

It is frequently necessary to splice the end of a telephone cable containing several hundred or several thousand twisted pairs of conductors to the end of another cable. When a new telephone cable is being installed, the cable is provided in lengths of several hundred feet so that every several hundred feet along the length of the cable, a splice must be made. It is also necessary to make splices between cable ends if the cable is accidentally severed or it is broken as a result of a natural phenomenon such as a hurricane or an earthquake.

The splicing of telephone cables is essentially a manual operation and must be carried out in the field, that is, in a manhole or on a suspended aerial cable. Telephone cable splicing operations are time consuming, tedius, and expensive because of the large number of splices which must be made and because of the large numbers of pairs of conductors in an individual cable.

The present invention is directed to an improved apparatus for crimping connecting devices onto the ends of wire pairs and is particularly intended for use in the splicing of telephone cables although other uses of the invention will be apparent to those skilled in the art. One type of connecting device or connector which can be crimped by an apparatus in accordance with the instant invention is disclosed and claimed in U.S. Patent 3,406,247 identified above. The structure of this connecting device and the structure of the herein disclosed and claimed apparatus are such that a lineman engaged in the operation of splicing telephone cable ends with the conductors deals with the conductors as pairs rather than as individual wires as has been common practice in the past.

An object of the invention is accordingly to provide an improved crimping apparatus for crimping electrical connectors onto conductors. A further object is to provide a crimping apparatus capable of crimping connecting devices having oppositely directed open sides. A still further object is to provide an improved crimping apparatus for crimping electrical connectors onto wire ends of the general type which trim the wire ends concomitantly with the crimping operation.

These and other objects of the invention are achieved in a preferred embodiment thereof in which the connecting device, as described in U.S. Pat. 3,406,247, comprises a pair of channel-shaped metallic connectors disposed in parallel back-to-back relationship so that their open sides face in opposite directions. The two metallic connectors are separated from each other by insulating material to which they are secured. The two connectors are thus maintained as separate electrical entities but constitute a single mechanical entity. A preferred form of crimping apparatus in accordance with the instant invention for crimping this device comprises a pair of opposed dies which are movable relatively towards and away from each other. Upon locating the connecting device between the dies with the open sides of the connecting device facing the opposed surfaces of the dies, and upon movement of the dies towards each other, the four sidewalls of the connecting device are inwardly formed and the two separate metallic connectors are crimped onto wires positioned between the dies. In accordance with my preferred embodiment, the two dies are provided with transversely extending slots intermediate their ends which are adapted to receive the end portions of the conductors which are to be connected. Wire cutting members are moved into these slots during crimping and the end portions of the wire are thereby severed while the dies are moving relatively towards each other. The preferred embodiment of the invention thus eliminates the necessity of trimming the wire ends prior to forming the electrical connections.

In the drawings:

FIG. 1 is a perspective view of a crimping apparatus in accordance with the invention showing the positions of the parts at the beginning of the operating cycle;

FIG. 2 is a side view of the crimping apparatus of FIG. 1;

FIG. 3 is a top plan view of the apparatus of FIG. 1 illustrating the manner in which the conductors are positioned in the apparatus when crimped connection is to be made;

FIG. 4 is a view taken along the lines 4—4 of FIG. 3,

FIG. 5 is a fragmentary top view on an enlarged scale, of the apparatus of FIG. 1 showing the positions of the parts at the time the wires are severed;

FIG. 6 is a view similar to FIG. 5 but showing the positions of the parts at the end of the crimping operation;

FIG. 7 is a perspective view of two twisted pairs of conductors;

FIG. 8 is a perspective view showing a connecting device crimped onto the conductors of two pairs;

Figure 9:
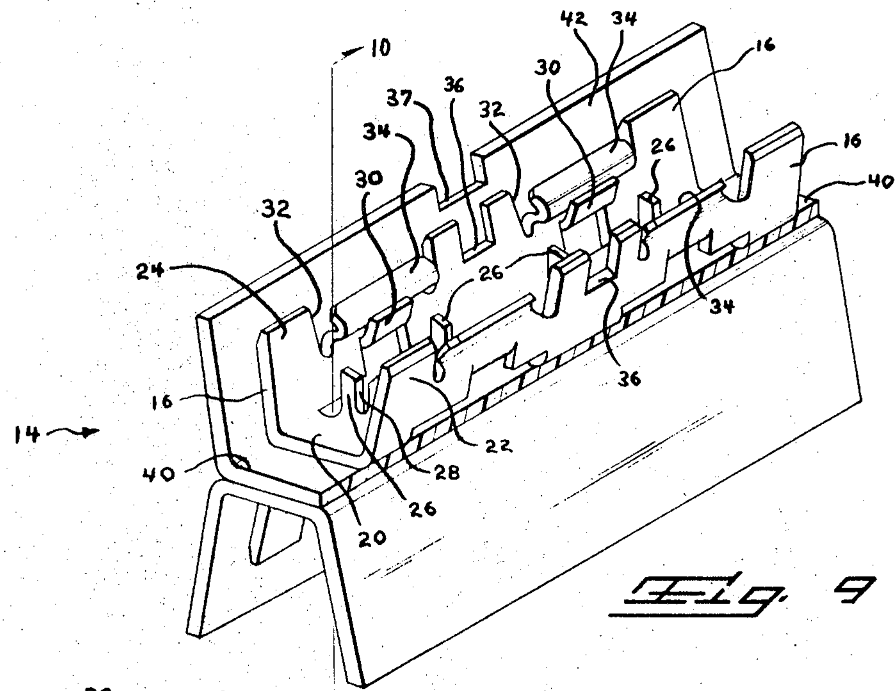
FIG. 9 is a perspective view, with parts broken away, of one form of connecting device adapted to be crimped by an apparatus in accordance with the instant invention.

FIG. 7 shows two twisted pairs 2, 4, of electrical conductors, the pair 2 comprising individual insulated conductors 6, 8 and the pair 4 comprising individual insulated conductors 10, 12. Insulated conductors of this type are commonly used in the telephone industry and it is frequently necessary to connect the pair 2, to the pair 4 by means of two electrically separate connections. In other words, the conductor 6 is connected to the conductor 10 and the conductor 8 is connected to the conductor 12.

Figure 10:
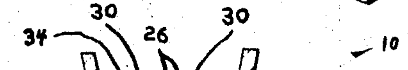
FIG. 10 is a view taken along the lines 10—10 of FIG. 9.

In accordance with the present invention, the two separate electrical connections required to join the pair 2 to the pair 4 are made by a single connecting device 14, FIGS. 9 and 10. This connecting device comprises two separate channel-shaped connector members 16, 18 which are identical to each other so that a description of one will suffice for both. The connector 16 comprises a generally flat web portion 20 having sidewalls 22, 24 extending from its longitudinal edges. A plurality of tongues 26 are struck-up from the web 20 of the connector and notches 28 extend downwardly from the upper edges of these tongues. As explained in U.S. Pat. No. 3,320,354, the width of the notches is such that when a conductor is forced downwardly into a notch, the edges of the notch penetrate the insulation and establish electrical contact with the conducting core of the conductor. In the disclosed embodiment, two tongues 26 are provided adjacent to each end of the connector. Flap like members 30 are struck-up from the sidewalls 22, 24, the length of the flaps being somewhat less than the distance between the two tongues at each end of the connector. These flaps function as stuffers when the connector is crimped and force the wires into the slots as more fully explained in the above-identified Pat. 3,320,354. Additionally, the sidewalls are notched as shown at 32 and the portions of the sidewalls between these notches are inwardly formed as indicated at 34. These inwardly formed sections of the sidewalls functioning to force the stuffers further into the space between the tongues upon crimping. The sidewalls are also notched at 36 intermediate the ends of the connector to facilitate bending of the sidewalls when the connector is crimped.

Each channel-shaped connector member 16, 18 is provided with a film of insulating material on its external surface, this film extending axially beyond the ends of the connector as shown at 40 and upwardly beyond the upper edges of the sidewalls as shown at 42. This film may be of any suitable insulating material, Mylar (polyethylene terephthalate) being a preferred material because of its toughness and its good dielectric properties. The insulated connector members are disposed back-to-back with the portions of the film on the web portions of the connector members being bonded along the interface indicated at 44 (FIG. 10). The complete connector device, as shown in the drawing, thus comprises two individual connector members of the type described in U.S. Pat. No. 3,320,354 bonded together so that they constitute a single mechanical entity but remain as separate electrical entities. Alternative forms of connector devices will be described below.

One form of crimping apparatus 46 for crimping the connector device 14 comprises a pair of blocks 48, 48′ mounted in face-to-face relationship on a pair of guide rods 52 which extend freely through the lower portions of the blocks and which have washers 54, 54′ on their ends to hold the blocks in assembled relationship. Springs 56 surround the rods 52 and bear against the opposed sides of the blocks to normally maintain the two blocks in spaced-apart relationship as shown in FIGS. 1–3 while permitting relative movement of the blocks towards and away from each other. The crimping apparatus 46 as shown in the drawing can be mounted on any suitable tool head or other actuating mechanism capable of moving the blocks 48, 48′ relatively towards and away from each other. For example, an apparatus in accordance with the invention can be provided in the form of a hand tool having a linkage of the general type shown in Application Ser. No. 596,672, filed Nov. 23, 1966, now Patent No. 3,438,407, by William R. Over. Alternatively, and where large numbers of twisted pairs of conductors are being connected, it will prove feasible to provide power actuator for moving the blocks 48, 48′ towards each other.

The blocks 48, 48′ have arm portions 50. 50′ which project towards each other and which have opposed faces 58, 58′. Trough-like die cavities 60, 60′ are provided in these opposed faces, these die cavities having generally convergent sidewall portions 62, 62′ that merge with generally parallel sidewall portions 64, these parallel sidewall portions being reversely curved to define cusps 66, 66′. As best shown in FIGS. 1 and 3, slots 68 are provided in the block 48 and complementary slots 68′ are provided in the block 48′, the slots 68′ being offset from the slots 68 so that the two are portions 50, 50′ can move past each other to fully crimp the connector as is illustrated in FIG. 6. Additionally, each block is provided with a central slot 70, 70′, the width of these slots being somewhat greater than the slots 68, 68′ and being sufficient to permit placement of the individual wires in the slots as shown in FIG. 3 and as will be described more fully below.

A combined wire trimming member and connector device supporting member is disposed between the opposed faces 58, 58′ of the blocks and comprises a pair of upwardly extending arms 72, 72′ which are integral with a support and guide bar 74. The horizontally extending arms of this guide bar 74 project into blind recesses 76, 76′ in blocks 48, 48′ and bear against springs 78, 78′ mounter in these recesses. It will be apparent from FIG. 4 that when the two blocks 48, 48′ move relatively towards each other, the springs 78, 78′ will be compressed and the arms 72, 72′ will recede into the slots 70, 70′. The distance between the opposed inner edges of the arms 72, 72′ is substantially equal to the distance between the notches 37 on the opposite sides of the connecting device 14. The arms 72, 72′ and the central portion of the bar 74 thus function as a support for the uncrimped connector as illustrated in FIGS. 2–4. The arms 72, 72′ also function as wire shearing members in co-operation with the sides of the slots 70, 70′ as explained below in the description of the operation of the disclosed embodiment.

The operation of the disclosed embodiment is as follows. The operator first positions an individual connecting device 14 in the pocket between the arms 72, 72′ with the edge portions of these arms extending into the notches 37 in the insulation of the connecting device. He then separates the end portions of the conductors of the pair 2 and locates the conductors 6, 8 in the die cavities 60, 60′ with the end portions of these conductors extending through the slots 70, 70′. He then positions the conductors 10, 12 on the opposite side of the support bar in the die recesses with their ends extending through the slots 70, 70′ beside the previously positioned conductors 6, 8. The tool is then actuated to cause the blocks 48, 48′ to move relatively towards each other. During the initial stage of the crimping operation, the blocks 48, 48′ will move relatively past the arms 72, 72′ and these arms will, in effect, move relatively into the slots 70, 70′. At this stage in the cycle (FIG. 5) the end portions of the wires will be trimmed by the shearing action of these arms 72, 72′ in co-operation with the sides of the slots 70, 70′. Upon further relative movement of the blocks 48, 48′ towards each other, the arms 72, 72′ will move entirely into the slots and the forming surfaces of the die cavities will move over the sidewalls of the connector, bend these sidewalls relatively inwardly and toward the connector webs as shown in FIG. 6. During such bending of the connector sidewalls, the individual wires will be pressed down into the notches 28 of the tongues 26 and the insulation of the conductors will be penetrated by the edge of these notches. After completion of the crimping operation, the wires 6 will thus be electrically connected to the wire 10 by means of the metallic connector member 16 and the wire 8 will be connected to the wire 12 by means of the connecting device 18. When the blocks 48, 48' return to their initial positions, the completed connection can then be removed from betwen the arms 72, 72'.

A significant advantage of the invention is that the pairs of conductors 2, 4 are handled and dealt with as pairs when the corresponding wires of these two pairs are connected to each other by a lineman. In other words, when the pair 2 is connected to the pair 4 (FIG. 7) the pair 2 is handled at only one time and the two individual conductors of the pair 6, 8 can be placed in the slots 70, 70' in a single operation. Similarly, the pair 4 need only be selected from the wire bundle and its two conductors 10, 12 positioned in the slots 70 in a single operation. Only one connecting device need be positioned in the tool in preparation for an operating cycle and only one operating cycle is carried out, that is, one cycle of movement of the blocks towards and away from each other, to form both of the electrical connections required. This feature of the invention results in substantial time saving as compared with twisted pair splicing methods in which the two electrical connections are made in separate steps.

A further significant advantage of the invention is that after the connections have been made by crimping the single connecting device 14, the wires of the pairs 2, 4 are held mechanically together by virtue of the fact that two separate electrical connectors constitute only a single structural entity. In a cable having several hundred or perhaps several thousand pairs of conductors, this feature of the invention results in a more compact splice between cable ends and prevents the individual wires of different pairs from becoming tangled with each other in the vicinity of the splice.

Figure 11:
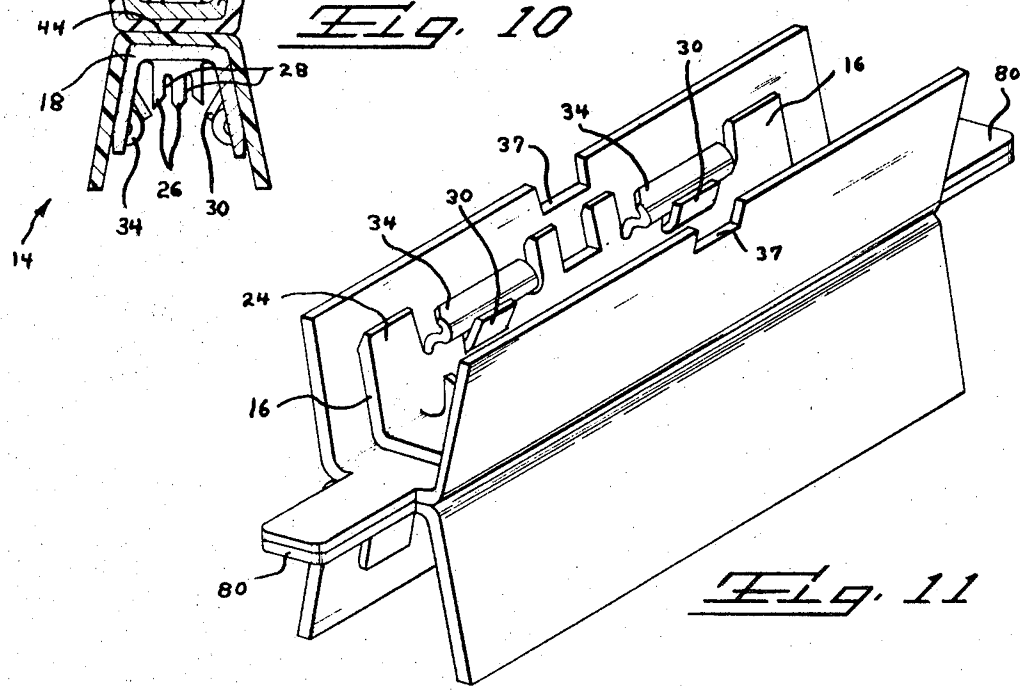
FIG. 11 is a perspective view of a modified form of connecting device.

Under some circumstances, the connecting device 14 may have a tendency to curl or bend along its axis during crimping and the resulting crimped connecting device will be accurate rather than straight. This may happen, for example, if the forces applied during crimping are not the same on the opposite sides of the connector, this tendency can be overcome by a number of methods. For example, Fig. 11 shows a modified form of connector in which tongues 80 of insulating material extend from each end of the connector, the crimping apparatus can be modified to grip and hold these tongues while it is being crimped. If the connector is thus held, the curling tendency will be overcome and the connector will be straight after crimping. As an alternative method of overcoming the curling tendency, the opposed faces 58 of the crimping apparatus can be provided with resiliently mounted connector engaging members extending from the die blocks 48 toward and against the sides of the connector positioned between the arms 72, 72'. Upon crimping, these connector holding members will recede into the blocks and will hold the connector while it is being crimped. The curling tendency can also be obviated by forming the connector out of relatively heavy stock capable of standing crimping without curling or bending.

It will be apparent that many alternative types of connectors might be used in the practice of the invention, the only requirement of the connector being that it have an open side into which the wires are placed upon crimping. For example, each metallic connector might be provided with a single sidewall on only one side of the connector rather than two sidewalls as in the disclosed embodiment. While the disclosed embodiment of the connecting device 14 comprises two insulated connectors bonded to each other, it would be obvious to manufacture the connecting device by providing an H-shaped extrusion of insulating material and positioning the metallic connectors 16, 18 on opposite sides of the cross-member of the extrusion.

Changes in construction will occur to those skilled in the art and various apparently different modifications and embodiments may be made without departing from the scope of the invention. The matter set forth in the foregoing description and accompanying drawings is offered by way of illustration only.

What I claim is:

1. Apparatus for crimping an electrical connecting device onto wires, said connecting device having crimpable means on two opposite sides thereof, said apparatus comprising:

a pair of normally spaced-apart crimping dies, said dies having forming surfaces on their opposed sides and being movable relatively towards and away from each other along a predetermined path, connecting device supporting means, said supporting means being normally spaced from, and between, said opposed faces of said dies, said supporting means being adapted to support said connecting device with said opposite sides of said connecting device facing said opposed sides of said dies, and recess means in at least one of said opposed sides of said dies, said recess means extending parallel to said path and being adapted to receive said supporting means thereby to permit said opposed sides to move close to each other whereby, upon locating said connecting device in said supporting means, positioning wires between said opposite sides of said connecting device and said dies, and moving said dies relatively towards each other, said connecting device is supported until crimping of said connecting device commences, and said supporting means moves relatively into said recess and said opposite sides of said connecting device are crimped onto said wires.

2. Apparatus as set forth in claim 1 wherein both of said dies have recess means, each of said recess means being adapted to receive portions of said supporting means, said recess means being adapted to receive the end portions of said wires, and severing means movable relatively into said recess means in advance of said supporting means to sever said wires in the planes of the sides of said recess means whereby said crimpable means are crimped onto the trimmed ends of said wires.

3. Apparatus as set forth in claim 2 wherein said supporting means comprises a pair of spaced-apart parallel members adapted to receive said connecting device therebetween, said arms having edges which are proximate to said forming surfaces and said recess means, said edges constituting said severing means.

4. Apparatus for crimping a pair of open U-type connectors onto wires, said connectors being disposed back-to-back with their open sides facing in opposite directions and being secured to each other, said apparatus comprising:

a pair of normally spaced-apart crimping dies, said dies having forming surfaces on their opposed sides and being movable relatively towards and away from each other, guide rod means extending between said dies and parallel to the path of movement of said dies towards each other, said dies being movable relatively over said guide rod means during movement of said dies towards each other, a pair of substantially parallel spaced-apart arms extending normally from said guide rod means, said arms being adapted to receive said connectors therebetween and to support said connectors during crimping, and slots in each of said dies, said slots extending inwardly from said opposed sides of said dies and being adapted to receive the end portions of said wires and said arms whereby, upon positioning said wires between said dies and said connectors with the end portions of said wire extending into said slots and upon movement of said dies towards each other, said wires are sheared in the planes of the sides of said slots as said arms move relatively into said slots and said connectors are crimped onto the trimmed ends of said wires.

References Cited

UNITED STATES PATENTS 3,438,407 4/1969 Over .............. 29—628X 3,443,299 5/1969 Brown .............. 29—203

THOMAS H. EAGER, Primary Examiner